US012348136B2

(12) United States Patent
Li et al.

(10) Patent No.: US 12,348,136 B2
(45) Date of Patent: Jul. 1, 2025

(54) APPARATUS AND METHOD FOR IMPROVING ADAPTIVE VOLTAGE POSITIONING PERFORMANCE OF VOLTAGE REGULATOR BY SENSING OUTPUT CAPACITOR CURRENT

(71) Applicant: MEDIATEK INC., Hsin-Chu (TW)

(72) Inventors: Chih-Chen Li, Hsinchu (TW); Jin-Yan Syu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 217 days.

(21) Appl. No.: 17/985,919

(22) Filed: Nov. 14, 2022

(65) Prior Publication Data

US 2023/0223849 A1    Jul. 13, 2023

Related U.S. Application Data

(60) Provisional application No. 63/298,249, filed on Jan. 11, 2022.

(51) Int. Cl.
  *H02M 3/157*   (2006.01)
  *H02M 1/00*    (2006.01)
  *H02M 1/08*    (2006.01)

(52) U.S. Cl.
  CPC ......... *H02M 3/157* (2013.01); *H02M 1/0006* (2021.05); *H02M 1/0009* (2021.05); *H02M 1/0025* (2021.05); *H02M 1/08* (2013.01)

(58) Field of Classification Search
  CPC .. H02M 3/157; H02M 1/0006; H02M 1/0009; H02M 1/0025; H02M 1/08; H02M 1/0019; H02M 3/156
  See application file for complete search history.

(56) References Cited

U.S. PATENT DOCUMENTS 7,605,572 B2   10/2009  Xu
10,425,006 B2   9/2019  Babazadeh
            (Continued)

FOREIGN PATENT DOCUMENTS

CN    100547512 C    10/2009
CN    102570799       7/2012
            (Continued)

OTHER PUBLICATIONS

V. Svikovic et al., Synchronous Buck Converter with Output Impedance Correction Circuit, 2012, pp. 727-734, IEEE, XP093042429.
            (Continued)

*Primary Examiner* — Kyle J Moody
(74) *Attorney, Agent, or Firm* — Winston Hsu

(57) ABSTRACT

A feedback circuit of a voltage regulator with adaptive voltage positioning (AVP) includes a first sensing circuit, a second sensing circuit, a third sensing circuit, and a processing circuit. The first sensing circuit generates a first feedback signal that provides information of an inductor current of the voltage regulator. The second sensing circuit generates a second feedback signal that provides information of an output voltage of the voltage regulator. The third sensing circuit generates a third feedback signal that provides information of a capacitor current of an output capacitor of the voltage regulator. The processing circuit generates a control voltage signal according to the first feedback signal, the second feedback signal, and the third feedback signal, and outputs the control voltage signal to a controller circuit of the voltage regulator for regulating the output voltage of the voltage regulator.

8 Claims, 2 Drawing Sheets

(56) References Cited

U.S. PATENT DOCUMENTS

| | | | |
|---|---|---|---|
| 11,018,599 B1 | 5/2021 | Vinciarelli | |
| 2013/0249505 A1* | 9/2013 | Brown | H02M 3/156 323/223 |
| 2015/0214827 A1* | 7/2015 | Yoon | H02M 1/14 323/286 |
| 2020/0144921 A1 | 5/2020 | Yuzurihara | |

FOREIGN PATENT DOCUMENTS

| | | |
|---|---|---|
| CN | 109995234 | 7/2019 |
| CN | 110168885 | 8/2019 |
| CN | 112020820 | 12/2020 |
| CN | 109494981 B | 4/2021 |

OTHER PUBLICATIONS

Pei-Hsin Liu et al., Auto-tuning and Self-calibration Techniques for V2 Control with Capacitor Current Ramp Compensation Using Lossless Capacitor Current Sensing, 2014, p. 1105-1112, IEEE, XP032680468.

Liu et al., "Auto-tuning and self-calibration techniques for $V^2$ control with capacitor current ramp compensation using lossless capacitor current sensing", 2014 IEEE Energy Conversion Congress and Exposition(ECCE), 2014, pp. 1105-1112. ,2014.

* cited by examiner

US 12,348,136 B2

APPARATUS AND METHOD FOR IMPROVING ADAPTIVE VOLTAGE POSITIONING PERFORMANCE OF VOLTAGE REGULATOR BY SENSING OUTPUT CAPACITOR CURRENT

CROSS REFERENCE TO RELATED APPLICATIONS

This application claims the benefit of U.S. Provisional Application No. 63/298,249, filed on Jan. 11, 2022. The content of the application is incorporated herein by reference.

BACKGROUND

The present invention relates to a voltage regulator design, and more particularly, to a feedback circuit of a voltage regulator with adaptive voltage positioning (AVP) that uses a feedback signal obtained from sensing an output capacitor current for compensation of a feedback signal obtained from sensing an inductor current and an associated feedback control method.

In an electronic device, a voltage regulator is used to supply stable power to electronic loads. The voltage regulator is typically designed to maintain an output voltage within specified limits. In some applications, the voltage regulator may support an adaptive voltage positioning (AVP) feature. Hence, in addition an output voltage of the voltage regulator, a load current supplied to a load may be considered in the feedback loop control. For example, the load may be a microprocessor. However, sensing the load current may not be feasible. To obtain the load information, inductor current is often sensed and used as an approximation of the load current. In some cases, this approximation fails and affects the performance of the output voltage regulation. Thus, there is a need for an innovative compensation design for a voltage regulator with AVP.

SUMMARY

One of the objectives of the claimed invention is to provide a feedback circuit of a voltage regulator with adaptive voltage positioning (AVP) that uses a feedback signal obtained from sensing an output capacitor current for compensation of a feedback signal obtained from sensing an inductor current and an associated feedback control method.

According to a first aspect of the present invention, an exemplary feedback circuit of a voltage regulator with adaptive voltage positioning (AVP) is disclosed. The exemplary feedback circuit includes a first sensing circuit, a second sensing circuit, a third sensing circuit, and a processing circuit. The first sensing circuit is arranged to generate a first feedback signal that provides information of an inductor current of an inductor of the voltage regulator. The second sensing circuit is arranged to generate a second feedback signal that provides information of an output voltage of the voltage regulator. The third sensing circuit is arranged to generate a third feedback signal that provides information of a capacitor current of an output capacitor of the voltage regulator. The processing circuit is arranged to generate a control voltage signal according to the first feedback signal, the second feedback signal, and the third feedback signal, and output the control voltage signal to a controller circuit of the voltage regulator for regulating the output voltage of the voltage regulator.

According to a second aspect of the present invention, an exemplary feedback control method applicable to a voltage regulator with adaptive voltage positioning (AVP) is disclosed. The exemplary feedback control method includes: generating a first feedback signal that provides information of an inductor current of an inductor of the voltage regulator; generating a second feedback signal that provides information of an output voltage of the voltage regulator; generating a third feedback signal that provides information of a capacitor current of an output capacitor of the voltage regulator; generating a control voltage signal according to the first feedback signal, the second feedback signal, and the third feedback signal; and outputting the control voltage signal to a controller circuit of the voltage regulator for regulating the output voltage of the voltage regulator.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
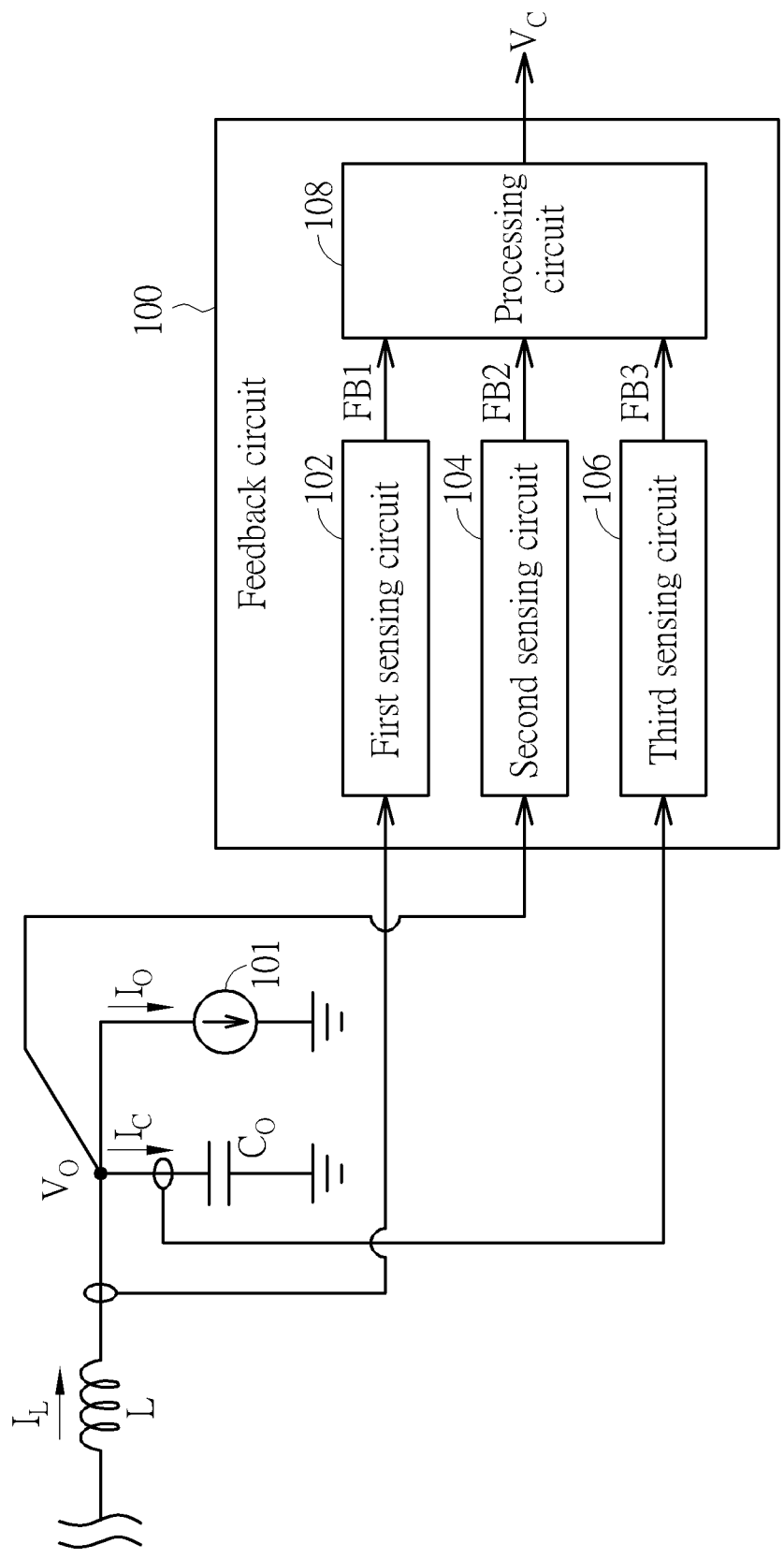
FIG. 1 is a diagram illustrating a feedback circuit of a voltage regulator with adaptive voltage positioning (AVP) according to an embodiment of the present invention.

FIG. 1 is a diagram illustrating a feedback circuit of a voltage regulator with adaptive voltage positioning (AVP) according to an embodiment of the present invention. The feedback circuit 100 includes a first sensing circuit 102, a second sensing circuit 104, a third sensing circuit 106, and a processing circuit 108. The first sensing circuit 102 is arranged to generate a first feedback signal FB1 that provides information of an inductor current $I_L$ of an inductor L of a voltage regulator (e.g. switching buck converter). The second sensing circuit 104 is arranged to generate a second feedback signal FB2 that provides information of an output voltage $V_o$ of the voltage regulator. The third sensing circuit 106 is arranged to generate a third feedback signal FB3 that provides information of a capacitor current $I_c$ of an output capacitor $C_o$ of the voltage regulator. The processing circuit 108 is arranged to generate a control voltage signal $V_c$ according to the first feedback signal FB1, the second feedback signal FB2, and the third feedback signal FB3, and output the control voltage signal $V_c$ to a controller circuit of the voltage regulator for regulating the output voltage $V_o$ of the voltage regulator. In this embodiment, the third sensing circuit 106 acts as a compensation circuit to compensate for deviation of the inductor current $I_L$. For example, the third sensing circuit 106 acts as a compensation circuit to compensate for deviation of the inductor current $I_L$ resulting from a dynamic voltage scaling (DVS) event, such as a DVS up event or a DVS down event. The DVS up event is to change the output voltage $V_o$ from a present voltage setting to a next voltage setting, where the next voltage setting is higher than the present voltage setting. The DVS down event is to change the output voltage $V_o$ from a present voltage setting to a next voltage setting, where the next voltage setting is lower than the present voltage setting.

As shown in FIG. 1, the average inductor current $ave(I_L)$ of the inductor L is equal to a sum of the average capacitor current $ave(I_c)$ of the output capacitor $C_o$ and the average load current $ave(I_o)$ of the load 101 (i.e. $ave(I_L)=ave(I_o)+ave(I_c)$). In a steady state, the average inductor current $ave(I_L)$ is equal to the average load current $ave(I_o)$ due to $ave(I_c)=0$. The inductor current $I_L$ can be sensed to act as an approximation of the load current $I_o$. Hence, the first sensing circuit 102 is arranged to generate the first feedback signal FB1 according to a sensed current signal that provides information of the inductor current $I_L$, and output the first feedback signal FB1 to the processing circuit 108. However, the above-mentioned approximation fails under some cases. If no compensation is applied to the inaccurate load current approximation that is based on the inductor current $I_L$, the AVP performance of the voltage regulator will be degraded.

For example, assuming that the proposed compensation circuit (i.e., third sensing circuit 106) is not enabled, the deviation of the output voltage $V_o$ may result from a DVS up event. The DVS up event is to change the output voltage $V_o$ from a present voltage setting to a next voltage setting, where the next voltage setting is higher than the present voltage setting. Hence, the increase of the inductor current $I_L$ is used to charge the output capacitor $C_o$, such that the output voltage $V_o$ can ramp up accordingly. Specifically, the capacitor current $I_c$ of the output capacitor $C_o$ is a non-zero charging current, and the extra charging current will be considered as an increase of the inductor current $I_L$ in the AVP loop. As a result, the output voltage $V_o$ has an undesired offset $\Delta V=\Delta I_L \times R_i$, where $R_i$ is the resistance value of the first sensing circuit 102. Specifically, due to the fact that the inductor current $I_L$ cannot be an approximation of the load current $I_o$ during the DVS up event, the output voltage $V_o$ is incorrectly adjusted towards a lower voltage level by the AVP loop.

For another example, assuming that the proposed compensation circuit (i.e., third sensing circuit 106) is not enabled, the deviation of the output voltage $V_o$ may result from a DVS down event. The DVS down event is to change the output voltage $V_o$ from a present voltage setting to a next voltage setting, where the next voltage setting is lower than the present voltage setting. Hence, the decrease of the inductor current $I_L$ is used to discharge the output capacitor $C_o$, such that the output voltage $V_o$ can ramp down accordingly. Specifically, the capacitor current $I_c$ of the output capacitor $C_o$ is a non-zero discharging current, and the extra discharging current will be considered as a decrease of the inductor current $I_L$ in the AVP loop. As a result, the output voltage $V_o$ has an undesired offset $\Delta V=\Delta I_L \times R_i$, where $R_i$ is the resistance value of the first sensing circuit 102. Specifically, due to the fact that the inductor current $I_L$ cannot be an approximation of the load current $I_o$ during the DVS down event, the output voltage $V_o$ is incorrectly adjusted towards a higher voltage level by the AVP loop.

To address the above issue, the present invention proposes using a compensation circuit (i.e., third sensing circuit 106) to generate the third feedback signal FB3 that provides information of the capacitor current $I_c$ of the output capacitor $C_o$. The third feedback signal FB3 derived from output capacitor current sensing can act as a compensation signal to compensate for the deviation of the inductor current $I_L$ resulting from a DVS event (e.g., DVS up event or DVS down event). Hence, the compensation circuit (i.e., third sensing circuit 106) may be enabled to generate the third feedback signal FB3 in response to the DVS event. An increase of the first feedback signal FB1 during a DVS up event can be compensated by the third feedback signal FB3 deriving from sensing a non-zero charging current $I_c$. A decrease of the first feedback signal FB1 during a DVS down event can be compensated by the third feedback signal FB3 deriving from sensing a non-zero discharging current $I_c$.

Figure 2:
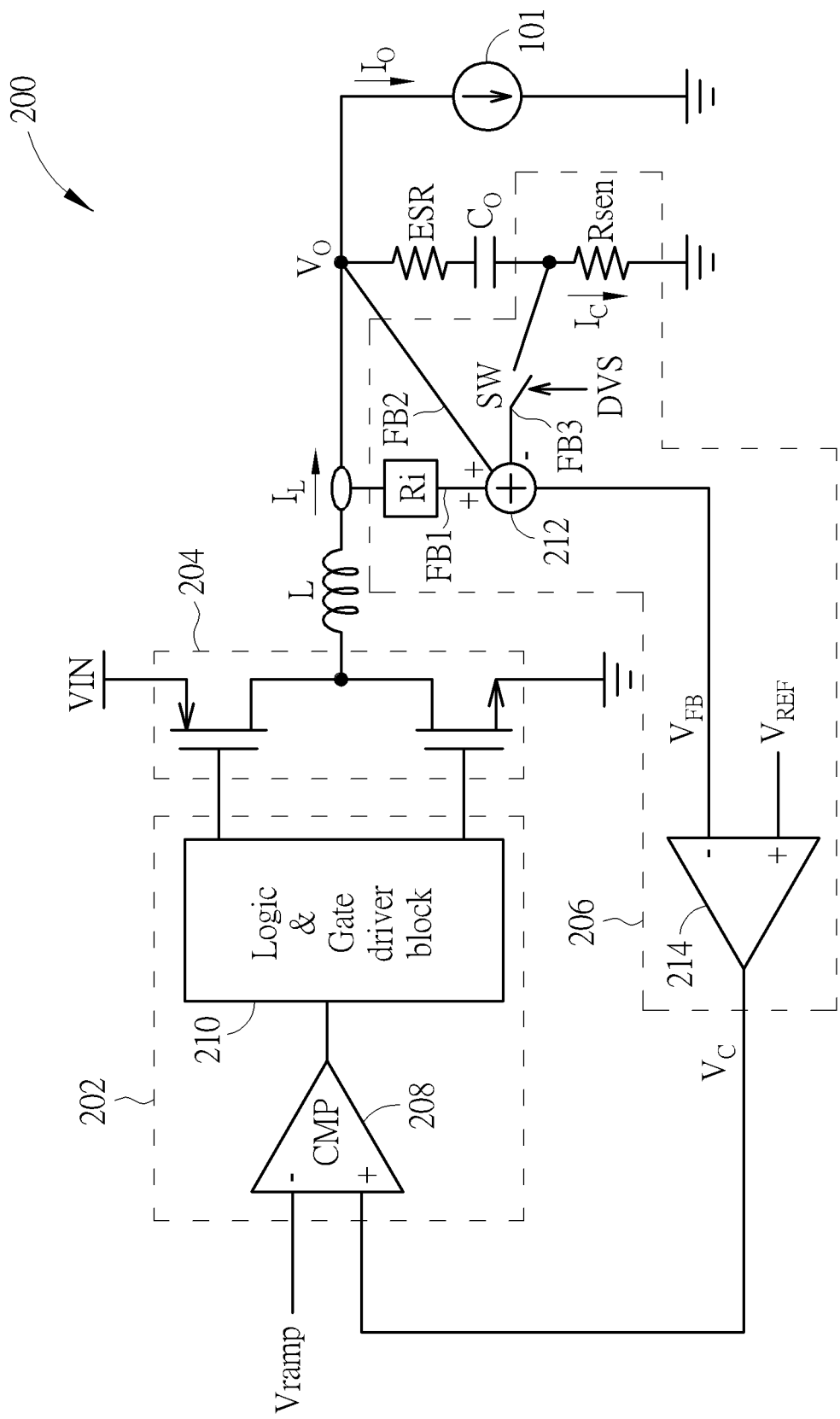
FIG. 2 is a diagram illustrating a voltage regulator with AVP according to an embodiment of the present invention.

FIG. 2 is a diagram illustrating a voltage regulator with AVP according to an embodiment of the present invention. The voltage regulator 200 may be a switching buck converter with AVP. The voltage regulator 200 is capable of regulating the output voltage $V_o$ delivered to the load 101 according to an input voltage VIN. For example, the input voltage VIN may be a direct-current (DC) voltage provided by a battery device, the load 101 maybe a microprocessor, and the output voltage $V_o$ may be a DC voltage provided to the microprocessor. It should be noted that the load current $I_o$ supplied to the load 101 may vary in response to different load conditions of the load 101. As shown in FIG. 2, the voltage regulator 200 may include a controller circuit 202, a power stage circuit 204, an inductor L, an output capacitor $C_o$, and a feedback circuit 206. The feedback circuit 206 is designed to provide the voltage regulator 200 with improved AVP performance during DVS.

The controller circuit 202 may include a comparator circuit (labeled by "CMP") 208 and a logic & gate driver block 210. In this embodiment, a control voltage signal $V_c$ fed into the comparator circuit 208 is output from the feedback circuit 206 that is a part of an AVP loop for regulating the output voltage $V_o$. As shown in FIG. 2, the comparator circuit 208 has a non-inverting node (+) for receiving a ramp signal $V_{ramp}$, and an inverting node (−) for receiving the control voltage signal $V_c$. Hence, the comparator circuit 208 compares the control voltage signal $V_c$ with the ramp signal $V_{ramp}$ for generating a comparison result for following pulse-width modulation (PWM) control. The logic & gate driver block 210 includes circuits arranged to deal with PWM control of the power stage circuit 204 and/or additional functions. For example, the logic & gate driver block 210 may also support over voltage protection, over current protection, etc. Regarding PWM control, the logic & gate driver block 204 can regulate the output voltage signal $V_o$ delivered to the load 101 by controlling PWM pulses applied to the power stage circuit 204. For example, the power stage circuit 204 may include a high-side switch and a low-side switch controlled by PWM pulses generated from the logic & gate driver block 204.

The feedback circuit 206 is responsible for generating and outputting the control voltage signal $V_c$ to the controller circuit 202 (particularly, comparator 208 of controller circuit 202). In this embodiment, the feedback circuit 206 enables an AVP feature of the voltage regulator 200, thereby allowing the voltage regulator 200 to position the output voltage $V_o$ for the light load just below the maximum voltage of a tolerance window and position the output voltage $V_o$ for the heavy load just above the minimum voltage of the tolerance window. Hence, the voltage regulator 200 with AVP can reduce the output capacitor $C_o$ and have improved power efficiency.

In this embodiment, implementation of the feedback circuit 206 follows the architecture of the feedback circuit 100 shown in FIG. 1. The feedback circuit 206 has a first sensing circuit with the resistance value $R_i$ for generating the first feedback signal FB1 (which provides information of the inductor current $I_L$), a second sensing circuit for generating the second feedback signal FB2 (which provides information of the output voltage $V_o$), and a third sensing circuit for providing the third feedback signal FB3 (which provides information of the capacitor current $I_c$), and further has a processing circuit (which includes a combining circuit 212 and an error amplifier circuit 214) for generating the control voltage signal $V_c$ according to the first feedback signal FB1, the second feedback signal FB2, and the third feedback signal FB3.

In this embodiment, the third sensing circuit includes a current sensing resistor Rsen and a switch circuit SW. The current sensing resistor Rsen is connected to the output capacitor $C_o$ (which has equivalent series resistance ESR) in series. The switch circuit SW is coupled between the combining circuit 212 and the current sensing resistor Rsen, and is switched on in response to a DVS event (labeled by "DVS"). Specifically, during the DVS event (e.g., DVS up event or DVS down event), the third feedback signal FB3 received by the combining circuit 212 is set by the voltage at one end of the current sensing resistor Rsen that passes through the switch circuit SW. Since the other end of the current sensing resistor Rsen is coupled to a ground voltage (e.g., 0V), the voltage at one end of the current sensing resistor Rsen is equal to the voltage across the current sensing resistor Rsen. However, using the current sensing resistor Rsen connected in series with the ground is for illustrative purposes only, and the present invention is not limited thereto. In practice, any means capable of measuring or estimating the capacitor current $I_c$ of the output capacitor $C_o$ may be adopted by the feedback circuit 206. These alternative capacitor current sensing designs all fall within the scope of the present invention.

The combining circuit 212 is arranged to combine the first feedback signal FB1, the second feedback signal FB2, and the third feedback signal FB3 to generate a feedback voltage signal $V_{FB}$. In this embodiment, the combining circuit 212 is arranged to add the first feedback signal FB1 to the second feedback signal FB2 for typical AVP control, and is further arranged to subtract the third feedback signal FB3 from the second feedback signal FB2 for proposed AVP compensation, to generate the feedback voltage signal $V_{FB}$. Since deviation of the first feedback signal FB1 (which reflects deviation of the inductor current $I_L$ during DVS) can be compensated by the third feedback signal FB3, the feedback voltage signal $V_{FB}$ may not be affected by the deviation of the inductor current $I_L$ during DVS. Hence, during the DVS event (e.g., DVS up event or DVS down event), the feedback voltage signal $V_{FB}$ is set by FB2+FB1−FB3. The error amplifier circuit 214 is arranged to receive the feedback voltage signal $V_{FB}$ and a reference voltage signal $V_{REF}$ (which is set by DVS), and generate the control voltage signal $V_c$ according to voltage difference between the feedback voltage signal $V_{FB}$ received at an inverting node (−) of the error amplifier circuit 214 and the reference voltage signal $V_{REF}$ received at a non-inverting node (+) of the error amplifier circuit 214. Since the third feedback signal FB3 prevents the feedback voltage signal $V_{FB}$ from being affected by the deviation of the inductor current $I_L$ during DVS, the output voltage $V_o$ may not suffer from an undesired offset $\Delta V = \Delta I_L \times R_i$ during DVS.

Regarding the typical AVP implementation, the feedback voltage signal $V_{FB}$ is generated according to the output voltage and the inductor current sensing. One compensation design may apply a constant current that is pre-defined according to a nominal capacitance value of the output capacitor $C_o$, for compensating the feedback voltage signal $V_{FB}$ during DVS. However, the actual capacitance value of the output capacitor $C_o$ may deviate from the nominal capacitance value due to the fact that the output capacitor $C_o$ has variation, voltage derating, and temperature coefficient. As a result, the constant current based compensation design fails to cover all conditions of the output capacitor $C_o$, and the output voltage $V_o$ may still suffer from the undesired offset $\Delta V = \Delta I_L \times R_i$ during DVS. In contrast to the compensation design that employs a constant current to compensate the feedback voltage signal $V_{FB}$ during DVS, the proposed compensation design employs sensing of the output capacitor current to compensate the feedback voltage signal $V_{FB}$ during DVS. Since the third feedback signal FB3 is derived from sensing the capacitor current $I_c$ of the output capacitor $C_o$, the third feedback signal FB3 provides real-time information of the capacitor current $I_c$ regardless of the actual capacitance value of the output capacitor $C_o$. Hence, the third feedback signal FB3 can cover all conditions of the output capacitor $C_o$, and minimize the undesired offset $\Delta V = \Delta I_L \times R_i$ of the output voltage $V_o$ during DVS.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A feedback circuit of a voltage regulator with adaptive voltage positioning (AVP), comprising:
   a first sensing circuit, arranged to generate a first feedback signal that provides information of an inductor current of an inductor of the voltage regulator;
   a second sensing circuit, arranged to generate a second feedback signal that provides information of an output voltage of the voltage regulator;
   a third sensing circuit, arranged to generate a third feedback signal that provides information of a capacitor current of an output capacitor of the voltage regulator; and
   a processing circuit, arranged to generate a control voltage signal according to the first feedback signal, the second feedback signal, and the third feedback signal, and output the control voltage signal to a controller circuit of the voltage regulator for regulating the output voltage of the voltage regulator, wherein the processing circuit comprises:
      a combining circuit, arranged to combine the first feedback signal, the second feedback signal, and the third feedback signal to generate a feedback voltage signal; and
      an error amplifier circuit, arranged to receive the feedback voltage signal and a reference voltage signal, and generate the control voltage signal according to a voltage difference between the feedback voltage signal and the reference voltage signal.

2. The feedback circuit of claim 1, wherein the combining circuit is arranged to add the first feedback signal to the second feedback signal and subtract the third feedback signal from the second feedback signal, to generate the feedback voltage signal.

3. A feedback circuit of a voltage regulator with adaptive voltage positioning (AVP), comprising:
- a first sensing circuit, arranged to generate a first feedback signal that provides information of an inductor current of an inductor of the voltage regulator;
- a second sensing circuit, arranged to generate a second feedback signal that provides information of an output voltage of the voltage regulator;
- a third sensing circuit, arranged to generate a third feedback signal that provides information of a capacitor current of an output capacitor of the voltage regulator; and
- a processing circuit, arranged to generate a control voltage signal according to the first feedback signal, the second feedback signal, and the third feedback signal, and output the control voltage signal to a controller circuit of the voltage regulator for regulating the output voltage of the voltage regulator;

wherein the third sensing circuit is arranged to generate the third feedback signal in response to a dynamic voltage scaling (DVS) event.

4. A feedback circuit of a voltage regulator with adaptive voltage positioning (AVP), comprising:
- a first sensing circuit, arranged to generate a first feedback signal that provides information of an inductor current of an inductor of the voltage regulator;
- a second sensing circuit, arranged to generate a second feedback signal that provides information of an output voltage of the voltage regulator;
- a third sensing circuit, arranged to generate a third feedback signal that provides information of a capacitor current of an output capacitor of the voltage regulator; and
- a processing circuit, arranged to generate a control voltage signal according to the first feedback signal, the second feedback signal, and the third feedback signal, and output the control voltage signal to a controller circuit of the voltage regulator for regulating the output voltage of the voltage regulator;
- wherein the third sensing circuit comprises:
  - a current sensing resistor, connected to the output capacitor in series; and
  - a switch circuit, coupled between the processing circuit and the current sensing resistor, wherein the switch circuit is switched on in response to a dynamic voltage scaling (DVS) event.

5. A feedback control method applicable to a voltage regulator with adaptive voltage positioning (AVP), comprising:
- generating a first feedback signal that provides information of an inductor current of an inductor of the voltage regulator;
- generating a second feedback signal that provides information of an output voltage of the voltage regulator;
- generating a third feedback signal that provides information of a capacitor current of an output capacitor of the voltage regulator;
- generating a control voltage signal according to the first feedback signal, the second feedback signal, and the third feedback signal; and
- outputting the control voltage signal to a controller circuit of the voltage regulator for regulating the output voltage of the voltage regulator;

wherein generating the control voltage signal according to the first feedback signal, the second feedback signal, and the third feedback signal comprises:
- combining the first feedback signal, the second feedback signal, and the third feedback signal to generate a feedback voltage signal; and
- generating the control voltage signal according to a voltage difference between the feedback voltage signal and a reference voltage signal.

6. The feedback control method of claim 5, wherein combining the first feedback signal, the second feedback signal, and the third feedback signal to generate the feedback voltage signal comprises:
- adding the first feedback signal to the second feedback signal and subtracting the third feedback signal from the second feedback signal, to generate the feedback voltage signal.

7. A feedback control method applicable to a voltage regulator with adaptive voltage positioning (AVP), comprising:
- generating a first feedback signal that provides information of an inductor current of an inductor of the voltage regulator;
- generating a second feedback signal that provides information of an output voltage of the voltage regulator;
- generating a third feedback signal that provides information of a capacitor current of an output capacitor of the voltage regulator;
- generating a control voltage signal according to the first feedback signal, the second feedback signal, and the third feedback signal; and
- outputting the control voltage signal to a controller circuit of the voltage regulator for regulating the output voltage of the voltage regulator;

wherein generating the third feedback signal that provides information of the capacitor current of the output capacitor of the voltage regulator comprises:
- generating the third feedback signal in response to a dynamic voltage scaling (DVS) event.

8. A feedback control method applicable to a voltage regulator with adaptive voltage positioning (AVP), comprising:
- generating a first feedback signal that provides information of an inductor current of an inductor of the voltage regulator;
- generating a second feedback signal that provides information of an output voltage of the voltage regulator;
- generating a third feedback signal that provides information of a capacitor current of an output capacitor of the voltage regulator;
- generating a control voltage signal according to the first feedback signal, the second feedback signal, and the third feedback signal; and
- outputting the control voltage signal to a controller circuit of the voltage regulator for regulating the output voltage of the voltage regulator;

wherein generating the third feedback signal that provides information of the capacitor current of the output capacitor of the voltage regulator comprises:
- setting the third feedback signal by a voltage of a current sensing resistor that is connected to the output capacitor in series; and
- switching on a switch circuit in response to a dynamic voltage scaling (DVS) event, wherein the third feedback signal is set by the voltage of the current sensing resistor that passes through the switch circuit.

* * * * *